United States Patent [19]
Torras

[11] Patent Number: 4,515,337
[45] Date of Patent: May 7, 1985

[54] SELF-LEVELING VEHICLE SEAT MOUNT

[75] Inventor: Robert M. Torras, Brunswick, Ga.

[73] Assignee: Kut-Kwick Corporation, Brunswick, Ga.

[21] Appl. No.: 378,632

[22] Filed: Jun. 17, 1982

[51] Int. Cl.³ ............................................. A47G 29/00
[52] U.S. Cl. .................................. 248/371; 248/185; 248/299
[58] Field of Search ............... 248/185, 299, 371, 133, 248/139, 140, 636; 297/314, 325

[56] References Cited

U.S. PATENT DOCUMENTS

| | | | |
|---|---|---|---|
| 1,274,317 | 7/1918 | Palmenberg | 248/185 |
| 2,569,730 | 10/1951 | O'Donnell | |
| 2,770,286 | 11/1956 | Weller | 297/314 |
| 3,466,089 | 9/1969 | Stueckle | 297/314 |
| 3,632,076 | 1/1972 | Rogers | 248/371 |
| 4,238,104 | 12/1980 | Hamilton | 248/636 X |

FOREIGN PATENT DOCUMENTS

| | | | |
|---|---|---|---|
| 938884 | of 0000 | Fed. Rep. of Germany | |
| 807336 | 6/1951 | Fed. Rep. of Germany | 297/314 |
| 1526334 | of 0000 | France | |

Primary Examiner—William H. Schultz
Attorney, Agent, or Firm—Jones & Askew

[57] ABSTRACT

An improved self-leveling vehicle seat mount including a horizontal seat platform for mounting a seat. The mount includes flange members to guide angular rotation and prevent lateral rotation of the seat platform, arcuate channels receive supporting rollers for guiding angular movement of the seat platform, vertical mounting members confronting the flange members for supporting and retaining the seat platform, and a detent for frictionally engaging the flange member to retard the rate of angular displacement in accordance with the weight of the operator of the vehicle.

15 Claims, 6 Drawing Figures

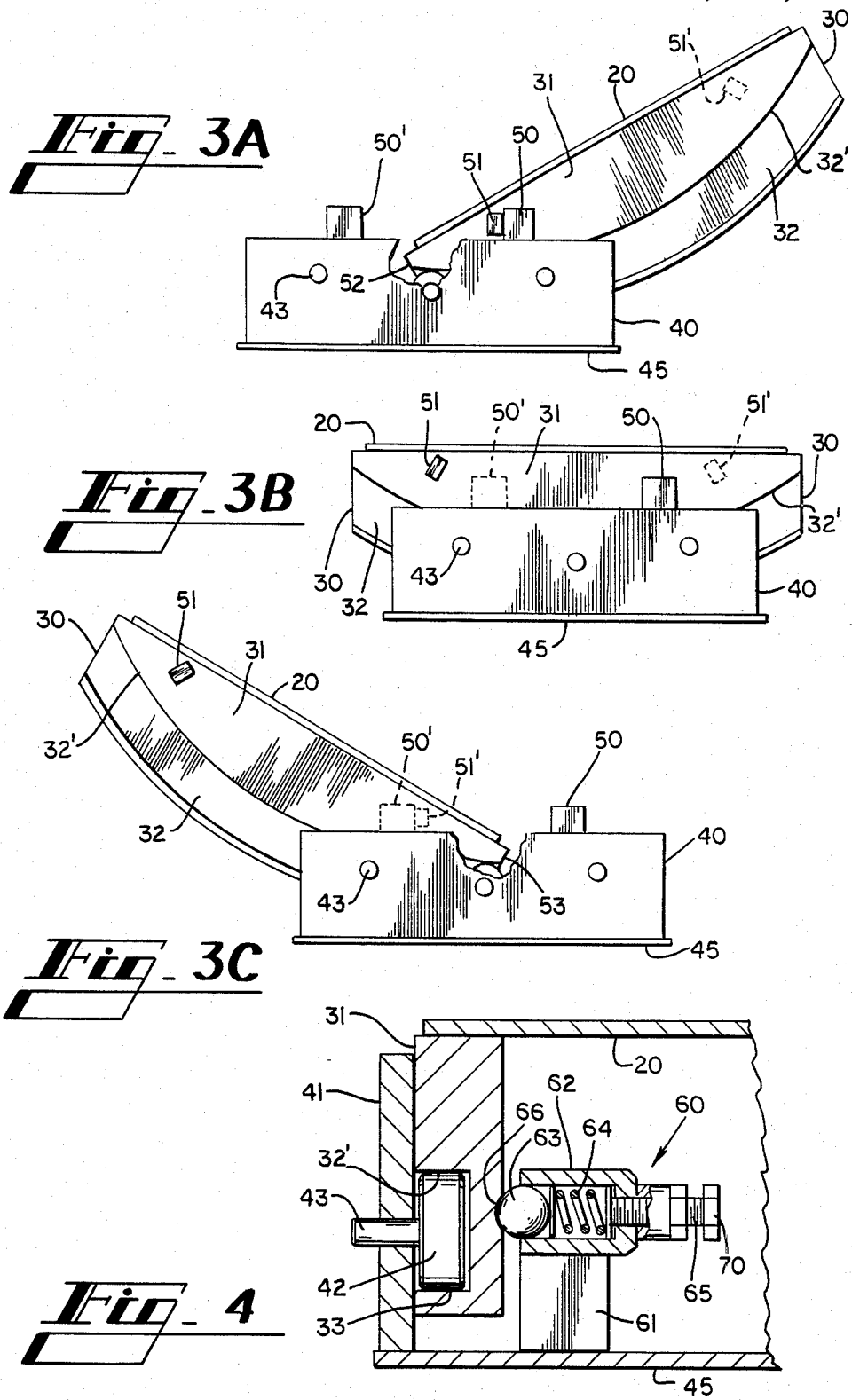

SELF-LEVELING VEHICLE SEAT MOUNT

FIELD OF INVENTION

The present invention relates generally to seats for vehicles, and specifically relates to a self-leveling apparatus for mounting a vehicle seat so as to maintain the seat horizontally level when the vehicle is operated on an incline.

DESCRIPTION OF THE PRIOR ART

It is generally desirable for the operator of a vehicle such as an agricultural tractor or a highway mower to sit level relative to the horizontal while operating the vehicle. Afflictions such as fatigue, back pain and the like can result if the operator is made uncomfortable due to an unlevel seat. Sustained operation of the vehicle over inclined areas, such as mowing the grassy banks adjacent limited access highways, can quickly lead to these afflictions if a self-leveling seat is not provided so that the operator may sit comfortably level. Moreover, the operator of an off-level vehicle is less able to maintain safe control if he or she is attempting to sit upright in a tilted seat.

Various self-leveling structures which maintain the vehicle seat level with respect to the horizontal have been proposed or made. For example, one self-leveling seat assembly of the prior art includes a seat, a support, rollers, arcuate track guides securing the seat to the support, and a hydraulic piston and cylinder combination secured to the seat and the support for dampening movement of the seat relative to the support. While this apparatus generally accomplishes seat leveling, the need for a hydraulic dampening mechanism unduly complicates the assembly and maintenance of the structure, and provides added expense. The required normal adjustment of the dampening apparatus also proved to be operationally undesirable for many users.

Mowers designed to reverse direction while traveling horizontally across a slope must have a seat which easily is reversed in direction of tilt, a function which is coordinated with the change of direction of the mower. As the machine is turned vertical to the slope the seat must simultaneously be brought to the level position and then tilted in the opposite direction to allow the operator to maintain his seating as the turn reversing direction is continued. A primary design consideration is that the tilting action be easily accomplished in a coordinated manner by the operator.

Another self-leveling seat structure is known which includes a seat member mounted to a vertical plunger, a spring receiving the plunger, and means for tensioning the spring. The plunger is received through a cylindrical opening in a carriage, which includes bosses having shafts journaled with rollers. The rollers ride within a pair of channel-shaped arcuate tracks which are secured to a seat supporting bar of the tractor. While this device also accomplishes seat leveling, the sheer number of parts and interconnections results in undue complexity, expense, and difficulty in assembly. There is therefore a need for a simple yet effective seat-leveling structure for vehicles which is easy and inexpensive to fabricate yet simple to maintain.

SUMMARY OF THE INVENTION

The present invention overcomes the above-mentioned problems of complexity of fabrication and maintenance.

Stated in general terms the vehicle seat mount of the present invention comprises a platform for mounting a seat, two or more cam tracks movable with the seat support, and plural rollers mounted on the vehicle and engagable with each cam track to support and guide the seat mount for pivotable movement. The mountings of cam tracks and rollers can be reversed, if desired. Each cam track preferably is supported by at least three rollers, and the cam tracks are open-ended to permit the tracks to move beyond at least one roller in extremes of angular movement relative to the vehicle while the track remains supported and retained by at least two rollers. The tracks and seat support thus can undergo a range of angular movement greater than the angular extent of the cam tracks. Guide plates on the seat support and the vehicle control lateral movement of the seat.

Stated somewhat more particularly, the present invention comprises a horizontal seat platform for mounting a seat, a flange attached to each end of the seat platform and extending downwardly beneath the seat platform, a channel formed in each flange and having an arcuate surface defining a cam track extending along a surface thereof for receiving rollers, and a vertical mounting member attached to the vehicle and carrying the rollers which are received within the arcuate channel in the flange member. The seat platform is thus movable relative to the vehicle to which the vertical mounting member is attached.

A spring-loaded detent may be positioned alongside the downwardly extending flange member and frictionally engages the flange member to retard the relative movement therebetween. The detent provides a predetermined resistance to the movement of the seat platform, and preferably is adjustable so that a variable tension may be placed on the spring to accommodate a variety of operator weights. A depression in the center of curvature or elsewhere along the flange member receives the detent and allows locking the movement of the seat platform at a certain angular position.

Advantageously, the present invention has few parts, no complicated linkages or hydraulics, and is therefore simple and inexpensive to fabricate, and provides the desired coordination of tilting action as the vehicle changes direction along a slope. Little maintenance other than adjustment of the spring-loaded detent and periodic greasing should be required.

Accordingly, it is an object of the present invention to provide an improved self-leveling vehicle seat.

It is another object of the present invention to provide a self-leveling vehicle seat mount which is simple and inexpensive to fabricate, assemble, and maintain.

It is another object of the present invention to provide a self-leveling vehicle seat mount wherein the position of the seat relative to the vehicle may be locked in a selected position such as a centered position for operation of the vehicle on relatively level surfaces without undesirable tilting of the seat.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3A shows an end view of the preferred embodiment, shown partially broken for illustration, wherein the seat platform is angularly displaced in one direction to a maximum extent.

FIG. 3B shows an end view of the preferred embodiment of the present invention wherein the seat platform and the mounting member are not angularly displaced.

FIG. 3C shows an end view of the preferred embodiment, shown partially broken for illustration, wherein the seat platform is angularly displaced to an opposite maximum extent from that shown in FIG. 3A.

FIG. 4 is a partial cross-sectional view taken along the line 4—4 of FIG. 2.

DETAILED DESCRIPTION OF THE PREFERRED EMBODIMENT

Figure 1:
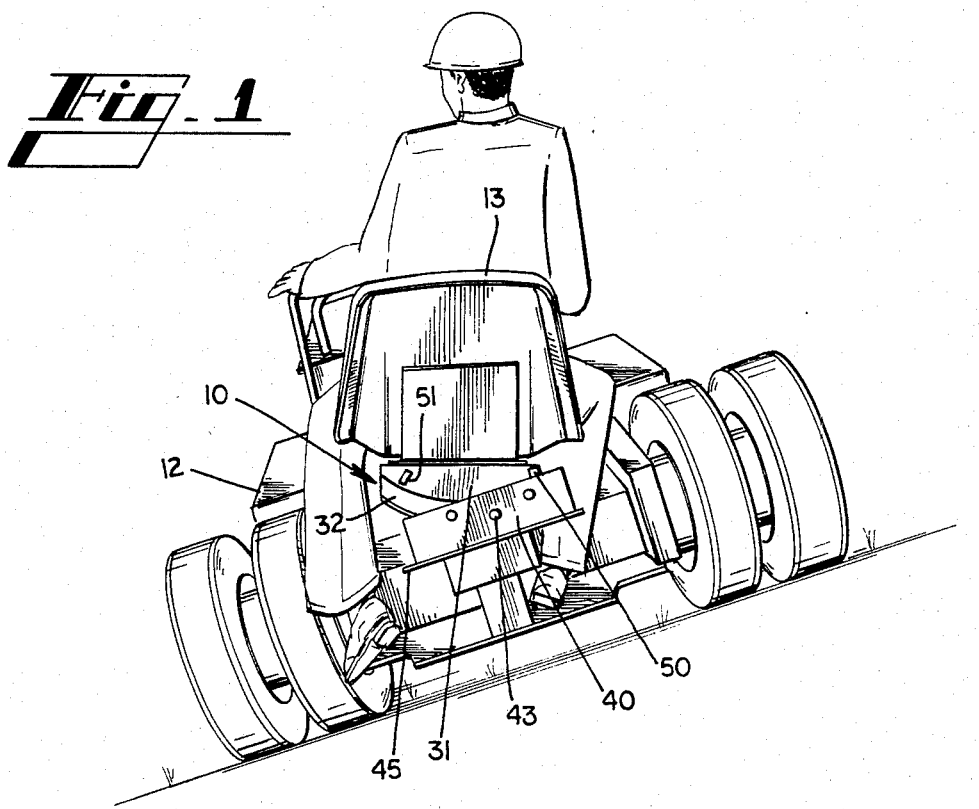
FIG. 1 shows a rear view of a mowing vehicle having the preferred embodiment of the present invention attached thereto.

Referring now to the drawings, in which like numerals indicate like elements throughout the several views, FIG. 1 shows a vehicle, in this case a mowing tractor 12, having attached thereon a self-leveling vehicle seat mount 10 constructed in accordance with the present invention. Attached to the mount 10 is a conventional seat portion 13 upon which the driver of the vehicle sits. It will be noted that the mount shown in FIG. 1 is horizontally level and therefore angularly displaced from the plane of the tractor 12 due to the placement of the tractor on an inclined surface such as an inclined bank along a highway.

Figure 2:
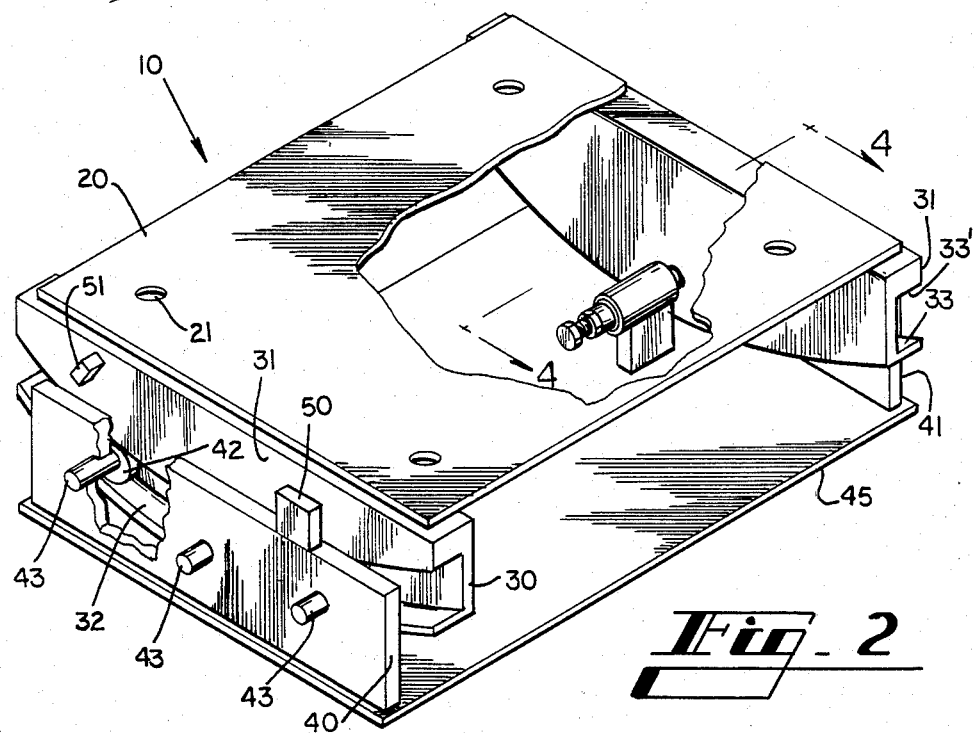
FIG. 2 is a partially cut-away pictorial view of the preferred embodiment of the present invention.

FIG. 2 shows a detailed and partial cut-away view of the mount 10 to which the seat 13 is mounted. The mount 10 includes an upper mounting plate 20 having a plurality of holes 21 placed therein for mounting a vehicle seat in the conventional manner. The upper mounting plate 20 shown in FIG. 2 is essentially rectangular and comprises a horizontal seat platform for mounting the vehicle seat (not shown in FIG. 2).

Upper mounting plate 20 has attached at opposite ends thereof, oriented transversely forwardly and rearwardly of the vehicle, a pair of arcuate flanges members 30, 31 which extend downwardly beneath the mounting platform 20. Each of flange members 30, 31 include an arcuate channel 32, 33, respectively, extending along an exterior vertical surface of the flange member. The channels have respective arcuate upper surfaces 32' and 33' (FIG. 2), and these upper surfaces define the cam tracks which support the seat mount 10 for angular movement and retain the seat mount, keeping it from leaving the vehicle. As pointed out below, however, the cam tracks can be separated from the flange members 30, 31. Flange members 30, 31 are relatively thick in cross-section as seen in FIG. 4, and the channels 32, 33 extend only part-way into that thickness. The flange members, because of channels 32, 33, thus possess an essentially solid cross section with a U-shaped channel in the outer surfaces. The length of flange members 30, 31 are oriented transversely of the mounting plate 20, that is, they extend transversely of the front to rear direction of the vehicle so that leveling is effectuated as the vehicle travels sideways across an incline, while allowing ease and coordination of angular change as the operator reverses the direction of the vehicle on the slope.

Upper mounting plate 20 and flange members 30, 31 are supported by a pair of vertical mounting members 40, 41 respectively, which are attached to the vehicle parallel to flange members 30, 31 to extend transversely of the front-to-rear direction of the vehicle. Vertical mounting members 40, 41 are rigidly attached to a lower mounting plate 45 by welding, bolting or the like, and the lower mounting plate in turn is affixed to the vehicle by similar means. Alternatively, vertical mounting members 40, 41 may be directly attached to the vehicle.

Mounting members 40, 41 support the flange members 30, 31 on the cam tracks 32', 33' via rollers 42, which have a diameter slightly smaller than the width of channels 32, 33. Rollers 42 are carried by shafts 43 which are journaled in vertical mounting members 40, 41. In the preferred embodiment, three rollers support each flange member and thus a total of six rollers support upper mounting plate 20; for the desired durability and load bearing capacity, the rollers may be industrial cam followers supported by roller bearings on the shafts 43.

The rollers travel on the cam tracks 32', 33' of the seat mount 10 in response to the angular movement of the upper mounting plate 20 with respect to the level of the lower mounting plate 45 and vertical mounting members 40, 41. Thus, when the vehicle is inclined as shown in FIG. 1, the attached seat 13 and upper mounting plate 20 can move relative to the lower mounting plate 45 to assume a level position, as the weight of the vehicle operator against the upper mounting plate 20 moves the channels 32, 33 along the support rollers. At least three rollers should support each track 32' and 33', and the angular spacing of the rollers supporting each track should be chosen to maintain at least two rollers supporting each track throughout the entire range of angular movement available to the seat mount.

The extent of leveling motion permitted between mounting plate 20 and vertical mounting members 40, 41 in the direction shown in FIG. 3A is limited by a stop 50 which is affixed to the top of vertical mounting member 40. A mating counterstop 51 is attached to flange member 30 displaced away from stop 50 when upper mounting plate 20 is level with respect to mounting member 40. As upper mounting plate 20 is horizontally displaced with respect to the level of mounting member 40, stop 50 and counterstop 51 will engage and prevent further displacement therebetween, thereby limiting the angular displacement. It will be appreciated that a matching stop 50' and counterstop 51' (shown in FIGS. 3A-3C) are placed on flange member 31 and mounting member 41 to prevent angular displacement between upper mounting plate 20 and lower mounting plate 45 in the direction shown in FIG. 3C, opposite that in which stop 50 and counterstop 51 are limiting. The mating pairs of stops and counterstops thus define the maximum range of angular movement which the seat mount can undergo.

Also shown in FIGS. 2 and 4 is a detent 60 for frictionally engaging flange member 31 so that the movement of the seat and upper mounting plate 20 will not be uncomfortably loose for the operator. Detent 60 in the preferred embodiment, described below in greater detail, comprises a spring loaded spherical bearing whose tension may be adjusted to provide more or less resistance to leveling movement, depending upon the weight of the operator. Detent 60 is positioned beneath upper mounting plate 20 adjacent flange member 31 so as to engage the surface of the flange member opposite channel 33. The detent is mounted on pillar 61 attached to the lower mounting plate 45.

FIGS. 3A–3C show the various angular displacements between the mounting plate 20 and vertical mounting member 40 and lower mounting plate 45. As seen in FIG. 3A, an end view of the apparatus shown in FIG. 2, the upper mounting plate 20 is displaced rightwardly to the maximum extent permitted when stop 50 and counterstop 51 engage. In this view, stop 50' which is attached to vertical mounting member 41 is visible.

In FIG. 3B, upper mounting plate 20 together with flange member 30 is shown horizontally level with respect to vertical mounting member 40 and lower mounting plate 45, a condition which obtains when the vehicle is operated on substantially level terrain. In FIG. 3C, upper mounting plate 20 and flange member 30 are displaced leftwardly to the maximum extent permitted by stop 50' and counterstop 51', which engage to prevent further angular displacement.

Because the ends of the channels 32, 33 are open, the cam tracks 32' and 33' can move off at least one roller to be supported by less than all rollers in the extremes of angular displacement, shown in FIGS. 3A and 3C. Thus, in FIG. 3A, the left end 52 and the channels 32, 33 of the seat mount 10 have moved inwardly beyond the left-most roller (hidden in FIG. 3A), but the tracks 32' and 33' remain supported by the center and right rollers 42. In FIG. 3C, the right end 53 of the seat mount has moved beyond the right-most roller but the tracks are supported by the center and left rollers. The range of angular displacement available to the upper mounting plate (and the seat) exceeds and the overall angular extent of the arcuate channels and cam tracks, and thus is greater than the range available with a closed roller-receiving channel of the same angular extent.

The construction of the present seat mount, including the relatively thick and uninterrupted flange members 30, 31 rigidly secured to the upper mounting plate 20, and the mounting members 40, 41 rigidly secured to the mounting plate 45 and closely confronting the flange members, allows the seat mount 10 to move only in one plane, and thus provides increased rigidity against twisting forces from the weight of the vehicle operator. The seat support can freely move to any permitted angular position without binding and without requiring the operator to manipulate any control to lock or release the seat support.

Although the flange members 30, 31 of the disclosed embodiment also incorporate the tracks 32' and 33', it should be understood that the tracks and associated rollers 42 can be provided separately from the flange members and confronting mounting members which prevent unwanted movement of the seat mount. Thus, two or more cam tracks could be located, for example, inboard of the flange members, and each such cam track would run on three or more rollers mounted on suitable supporting structure carried by the lower mounting plate 45 and retaining the seat mount on the vehicle.

FIG. 4 is a cross-sectional view taken along the line 4—4 of FIG. 2, and shows the preferred embodiment of detent 60. Detent 60 includes a cylindrical housing 62 which is mounted atop pillar 61, which in turn is affixed to the lower mounting plate 45. The housing 62 and pillar 61 are positioned alongside flange member 31 beneath upper mounting plate 20 so that the open end of housing 62 faces the surface of the flange member 31 opposite the opening of channel 33. A spherical ball 63 partially confined within housing 62 engages the surface of flange member 31 and is biased against the surface by a coil spring 64 which is confined within housing 62. The compression of spring 64 is adjusted by a bolt 65 which is threadingly engaged through the end of housing 62 opposite the opening for the ball 63 and has attached a knob 70 opposite the threaded engagement with the housing 62. The knob 70 may be used to increase or decrease the compression on spring 64 so that the weight of the operator causes angular displacement of the seat relative to the vehicle at a comfortable rate.

If it is desired that the speed of movement of the seat relative to the tilt of the vehicle be more rapid, the compression on spring 64 may be decreased so that the seat is relatively loose and moves freely to allow coordinated movement while reversing direction on hills.

Flange member 31 may include detents or indents such as the spherical recess 66 positioned at desired locations on the surface of the flange member at the center of curvature of the ball 63 confronting the inner surface of the flange member, such as when the upper mounting plate 20 is level with respect to the lower mounting plate 45. In this level position, the ball 63 snaps into the spherical recess 66 and provides a detent offering additional resistance to relative angular displacement from the normal level position shown in FIG. 3B. The detent effect provided by the recess 66 tends to maintain the upper mounting plate and the operator's seat in the normal level position, tilting or tipping as the vehicle undergoes relatively minor tilting while traveling along a substantially level path.

It will be understood that a detent may be provided at other angular positions. Moreover, the spring-loaded ball can be replaced by other detent structure such as a spring or the like.

The preferred embodiment of the present invention has been disclosed by way of example and it will be understood that other modifications may occur to those skilled in the art without departing from the scope and the spirit of the appended claims.

I claim:

1. A self-leveling seat support for a vehicle, comprising:
   a seat platform for supporting a seat member;
   mounting means supported on the vehicle and having a first set of surfaces extending across the length of the vehicle;
   said seat platform having a second set of surfaces extending across the length of the vehicle in confronting relation with the first set of surfaces, so that the confronting surfaces allow the seat platform to move in only one plane with respect to the mounting means;
   means defining an arcuate open-ended track on one of said confronting surfaces;
   a plurality of support elements disposed on the other of said confronting surfaces and engaging said arcuate track, so that said seat support platform is movably supported by said support elements and said arcuate track for angular movement in said one plane relative to said mounting means; and
   said open ends of said track allowing some of said supporting elements to move off and on the track as the seat platform undergoes said angular movement relative to the mounting means, so that the maximum range of available angular movement is not limited by the length of the track.

2. Apparatus as in claim 1, further comprising:

means for limiting the maximum available angular movement of said seat platform relative to said mounting means to a range of movement which prevents all said support elements from simultaneously moving off the track, while permitting some of the support elements to move off and on the track so that the maximum available angular movement exceeds the angular extent of said arcuate track.

3. Apparatus as in claim 2, wherein:

at least three of said support elements engage said arcuate track and support said seat platform for angular movement; and said limiting means defines the maximum range of said angular movement to allow at least one support element to move off and on the open ends of the track, and so that any two of said support elements remain engaging the track and supporting said seat platform whatever the angular position in said range of angular movement.

4. Apparatus as in claim 1, further comprising:

detent means operatively associated with said mounting means and said seat platform at least at one location on said range of angular movement, and operative to retard but not prevent angular movement away from said one location.

5. Apparatus as in claim 1, further comprising:

means defining a first set of plate surfaces attached to said seat platform and movable with the seat platform perpendicular to the plane of said angular movement;

means defining a second set of plate surfaces attached to said mounting means; and each plate surface of said first set being paired in closely confronting spaced apart parallel relation with a plate surface of said second set, so that the confronting plate surfaces allow the seat platform to move only in the plane of angular movement.

6. A self-leveling seat support for a vehicle, comprising:

a seat platform for mounting a seat member;

at least one flange member attached to said seat platform extending downwardly beneath said seat platform, said flange member having substantial thickness and having a surface depending downwardly from the seat platform;

each said flange including an arcuate channel formed in said surface and shallower than said thickness of the flange member;

a vertical mounting member supported on the vehicle in confronting spaced relation to said surface of the flange member; and a plurality of roller means for supporting said flange member and said seat platform, each roller means having an axle journaled in said mounting member and having a roller engaging said arcuate channel of said flange member, so that the attitude of said seat platform can undergo angular displacement with respect to said vertical mounting member and the vehicle.

7. The apparatus of claim 6, further comprising stop means for limiting the angular movement of said seat platform with respect to said vehicle to a predetermined maximum extent.

8. The apparatus as in claim 6, further comprising:

detent means associated with said flange member for frictionally engaging said flange member to retard the movement thereof relative to said vertical mounting member.

9. The apparatus of claim 8, wherein said detent means comprises, a spherical bearing contacting with said flange member, a housing for supporting said bearing, and spring means confined within said housing for biasing said bearing against said flange member.

10. The apparatus of claim 9, wherein the bias of said spring means is adjustable.

11. The apparatus of claim 9, wherein said flange member includes a recess at the center of curvature of said flange member for receiving said bearing when said seat platform and said vehicle are substantially parallel.

12. The apparatus of claim 8, wherein said detent means are positioned alongside a surface of said flange member opposite said arcuate channel of said flange member.

13. A self-leveling seat support for a vehicle, comprising:

mounting means for attachment to the vehicle, said mounting means including a first pair of parallel support plates spaced from each other along the length of the vehicle and each extending across the length of said vehicle;

a seat platform for supporting a seat member in movable relationship with respect to said mounting means, said seat platform including a second pair of parallel support plates spaced from each other along the length of the vehicle and each extending across the length of the vehicle in confronting relationship with the support plates of said first pair of support plates;

said second pair of support plates forming, along with said first pair of support plates, pairs of confronting support plates;

one of the support plates of each pair of confronting support plates comprising an open-ended arcuate track and the other of the support plates of each pair of confronting support plates comprising a plurality of support elements positioned in an arcuate array and extending into the open-ended arcuate track of its confronting support plate; and some of said plurality of support elements being free to move off and on the open ends of their respective arcuate tracks as the seat support platform undergoes angular movement relative to the mounting means, so that the extent of available angular movement of the seat support platform with respect to the mounting means is not limited by the length of the track, and so that the confronting support plates allow the seat platform to move in only one plane.

14. A self-leveling seat support for a vehicle, comprising:

a seat platform for mounting a seat member;

at least one flange member attached to said seat platform and extending downwardly beneath said seat platform, said flange member having substantial thickness and having a surface depending downwardly from the seat platform;

a vertical mounting member supported on the vehicle in confronting spaced relation to said surface of the flange member;

an arcuate channel formed in the confronting surface of one of said flange member and said vertical mounting member; and the other of the flange member and the vertical mounting member having on its confronting surface a plurality of roller means for engaging said arcuate channel and supporting said seat platform, each roller means having an axle supported on said other member and having a roller engaging said arcuate channel, so that the attitude of said seat platform can undergo angular displacement with respect to said vertical mounting member and the vehicle.

15. The apparatus as in claim 14, wherein said arcuate channel is open-ended so as to allow some of said rollers to move on and off the channel as the seat platform undergoes said angular displacement, whereby the maximum extent of said angular displacement can exceed the length of said channel.

* * * * *